United States Patent
Kim (10) Patent No.: US 12,015,177 B2
(45) Date of Patent: Jun. 18, 2024

(54) ELECTRODE ASSEMBLY WITH IMPROVED CONNECTION BETWEEN CURRENT COLLECTOR AND ELECTRODE TAB AND METHOD OF MANUFACTURING THE SAME

(71) Applicant: LG CHEM, LTD., Seoul (KR)

(72) Inventor: Kyung Min Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 416 days.

(21) Appl. No.: 16/969,386

(22) PCT Filed: Apr. 15, 2019

(86) PCT No.: PCT/KR2019/004513
§ 371 (c)(1),
(2) Date: Aug. 12, 2020

(87) PCT Pub. No.: WO2019/245144
PCT Pub. Date: Dec. 26, 2019

(65) Prior Publication Data
US 2020/0403211 A1  Dec. 24, 2020

(30) Foreign Application Priority Data
Jun. 20, 2018 (KR) .................. 10-2018-0071079

(51) Int. Cl.
*H01M 50/581* (2021.01)
*H01M 10/0587* (2010.01)
(Continued)

(52) U.S. Cl.
CPC ..... *H01M 50/581* (2021.01); *H01M 10/0587* (2013.01); *H01M 50/531* (2021.01);
(Continued)

(58) Field of Classification Search
CPC ............ H01M 50/531; H01M 50/581; H01M 10/0587; H01M 2200/106
(Continued)

(56) References Cited

U.S. PATENT DOCUMENTS 9,225,000 B2   12/2015  Geoffroy et al.
9,634,334 B2   4/2017   Ro et al.
(Continued)

FOREIGN PATENT DOCUMENTS

CN   1728419 A     2/2006
CN   207009539 U   2/2018
(Continued)

OTHER PUBLICATIONS

Kong (translation) (Year: 2006).*
(Continued)

*Primary Examiner* — Matthew T Martin
*Assistant Examiner* — Paul Christian St Wyrough
(74) *Attorney, Agent, or Firm* — Birch, Stewart, Kolasch & Birch, LLP (57) ABSTRACT

An electrode assembly with improved connection between current collectors and electrode tabs, and a method for manufacturing the same, for assuring safety with respect to overcharge, and battery capacity by improving a connection structure between the electrode tab and the current collector are provided. The electrode assembly for a rechargeable battery includes: an electrode current collector; an uncoated region in which an electrode active material layer is not formed, and provided on one side of the electrode current collector; an electrode tab disposed in the uncoated region; and a conductive adhesion portion that is disposed between the uncoated region and the electrode tab. The conductive adhesion portion comprises a positive temperature coefficient (PTC) material.

5 Claims, 11 Drawing Sheets

(51) Int. Cl.
  *H01M 50/531* (2021.01)
  *H01M 50/534* (2021.01)
  *H01M 50/574* (2021.01)
(52) U.S. Cl.
  CPC ....... *H01M 50/534* (2021.01); *H01M 50/574* (2021.01); *H01M 2200/106* (2013.01)
(58) Field of Classification Search
  USPC .......................................................... 429/61
  See application file for complete search history.

(56) References Cited

U.S. PATENT DOCUMENTS

| | | | |
|---|---|---|---|
| 2001/0018147 | A1 | 8/2001 | Yanai et al. |
| 2006/0040181 | A1 | 2/2006 | Kim et al. |
| 2007/0166611 | A1 | 7/2007 | Oh et al. |
| 2010/0261064 | A1 | 10/2010 | Oh et al. |
| 2012/0189881 | A1 | 7/2012 | Geoffroy et al. |
| 2012/0295145 | A1 | 11/2012 | Kim et al. |
| 2016/0285070 | A1 | 9/2016 | Woo et al. |
| 2017/0309970 | A1 | 10/2017 | Kim et al. |

FOREIGN PATENT DOCUMENTS

| | | | | |
|---|---|---|---|---|
| JP | 2009-331602 | A | | 11/2000 |
| JP | 2004-253270 | A | | 9/2004 |
| JP | 2009283218 | A | * | 12/2009 |
| JP | 2015-130364 | A | | 7/2015 |
| JP | 2016-181469 | A | | 10/2016 |
| JP | 2017022060 | A | * | 1/2017 |
| JP | 2017-130320 | A | | 7/2017 |
| KR | 1020060011247 | | * | 1/2006 ........... H01M 10/052 |
| KR | 10-2006-0011247 | A | | 2/2006 |
| KR | 10-2006-0072029 | A | | 6/2006 |
| KR | 20060011247 | A | * | 7/2006 ............ H01M 10/48 |
| KR | 100709882 | B1 | * | 7/2007 |
| KR | 10-2013-0133162 | A | | 12/2013 |
| KR | 10-2013-0137848 | A | | 12/2013 |
| KR | 10-2015-0015072 | A | | 2/2015 |
| KR | 20160073298 | A | * | 11/2015 ............... H01C 7/02 |
| KR | 10-2016-0073298 | A | | 6/2016 |
| KR | 20160073298 | A | * | 6/2016 ............. H01M 4/62 |
| KR | 10-2016-0115197 | A | | 10/2016 |
| KR | 20170060937 | A | * | 6/2017 |
| WO | WO 2017/175480 | A1 | | 10/2017 |

OTHER PUBLICATIONS

Ho (Translation) (Year: 2015).*
Ku (translation) (Year: 2006).*
Ho (translation) (Year: 2016).*
Hoon (machine translation) (Year: 2007).*
Kim (machine translation) (Year: 2017).*
JP-2017022060-A (machine translation) (Year: 2017).*
JP-2009283218-A (machine translation) (Year: 2009).*
Extended European Search Report for European Application No. 19823661.4, dated Mar. 24, 2021.
International Search Report (PCT/ISA/210) issued in PCT/KR2019/004513, dated Jul. 24, 2019.
Wu, "Concise Dictionary of Fine Chemicals", Liaoning Science and Technology Press, No. 648m, Jun. 1999, 3 pages total with an English abstract.

* cited by examiner

ELECTRODE ASSEMBLY WITH IMPROVED CONNECTION BETWEEN CURRENT COLLECTOR AND ELECTRODE TAB AND METHOD OF MANUFACTURING THE SAME

CROSS-REFERENCE(S) TO RELATED APPLICATION

This application claims priority to and the benefit of Korean Patent Application No. 10-2018-0071079 filed in the Korean Intellectual Property Office on Jun. 20, 2018, the entire contents of which are incorporated herein by reference.

TECHNICAL FIELD

The present invention relates to a rechargeable battery and a method for manufacturing the same, and more particularly, it relates to an electrode assembly of which a connection structure between an electrode tab and a current collector is improved, and a method for manufacturing the same.

BACKGROUND ART

In recent years, as demand for portable electronic products such as notebook computers, video cameras, and mobile phones has been rapidly increased, and electric vehicles, energy storage batteries, robots, satellites, etc. have been developed in earnest, a rechargeable battery used as a driving power source has been actively researched and studied.

Such a rechargeable battery may for example include a nickel cadmium battery, a nickel hydrogen battery, a nickel zinc battery, a lithium rechargeable battery, and the like. Among them, a lithium rechargeable battery has been widely used in the field of high-tech electronic devices because it has almost no memory effect compared with the nickel-based rechargeable battery, is freely charge and discharge, and has a very low self-discharge rate, a high operating voltage, and high energy density per unit weight.

However, when a lithium rechargeable battery is exposed to a high temperature, or a large amount of current flows in a short time due to overcharge, external short circuit, nail penetration, local damage, etc., there is a risk of the battery being heated by IR heat and occurrence of an explosion. That is, when the pressure or temperature of the battery rises, the decomposition reaction of the active material and the many side reactions proceed, thereby rapidly raising the temperature of the battery, which further accelerates the reaction between the electrolyte and the electrode. Eventually, a thermal runaway phenomenon occurs in which the temperature of the battery increases sharply, thereby resulting in ignition of the battery, and the lithium rechargeable battery explodes due to the internal pressure of the battery.

Thus, various methods for effective control a lithium rechargeable battery in an abnormal operation situation such as an overcurrent state, a high-temperature state, and the like have been discussed. A method in which an element may be mounted at an outer side of a cell and a method in which a material is provided inside the cell are used to assure stability. The former includes a positive temperature coefficient (PTC) element that uses a temperature change, a CID element, a protection circuit that controls a voltage and a current, and a stability vent that uses an internal pressure change of a battery, and the latter includes adding a material that can be physically, chemically, or electrochemically changed according to temperature, voltage, and current changes in the battery.

When the method that uses a material inside the cell is performed, no additional installation process is required and it is applicable to all kinds of batteries, but performance of the battery such as a rate characteristic and battery capacity may be deteriorated due to the addition of the material, and operational reliability may not be assured. Thus, various methods that can provide a definite current blocking effect while minimizing battery performance deterioration have been discussed.

The lithium rechargeable battery usually uses a lithium-based oxide and a carbon material as a positive electrode active material and a negative electrode material, respectively. A positive electrode in which the positive electrode active material is coated on a current collector and a negative electrode in which the negative electrode active material is coated on a current collector are disposed, while disposing a separation membrane therebetween such that an electrode assembly is formed, and the electrode assembly is received in an exterior material together with an electrolyte solution and then sealed.

Figure 1:
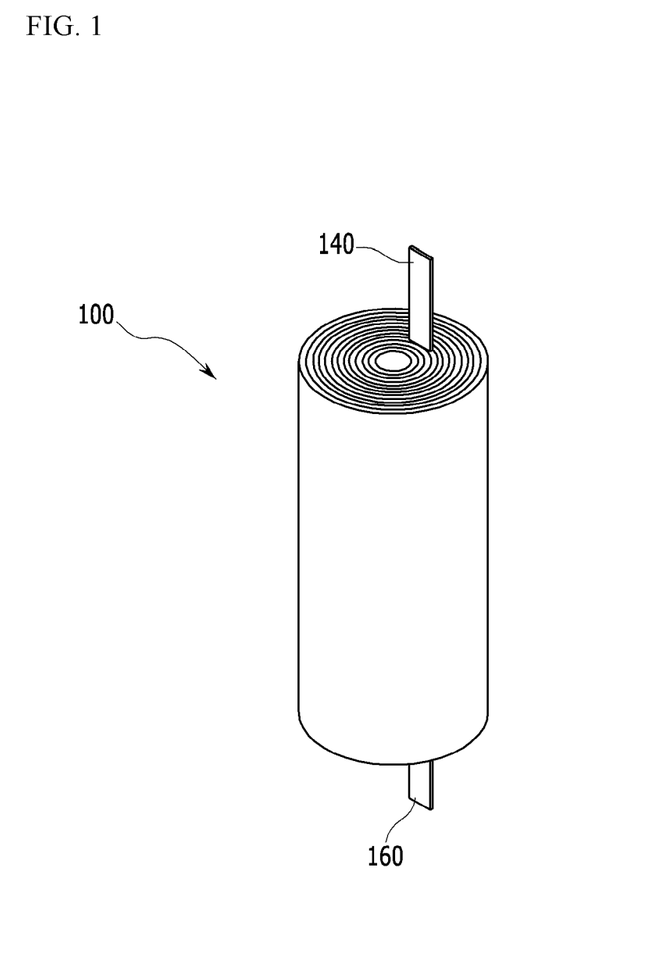
FIG. 1 is a perspective view of a conventional jelly roll-shaped electrode assembly.
Figure 2:
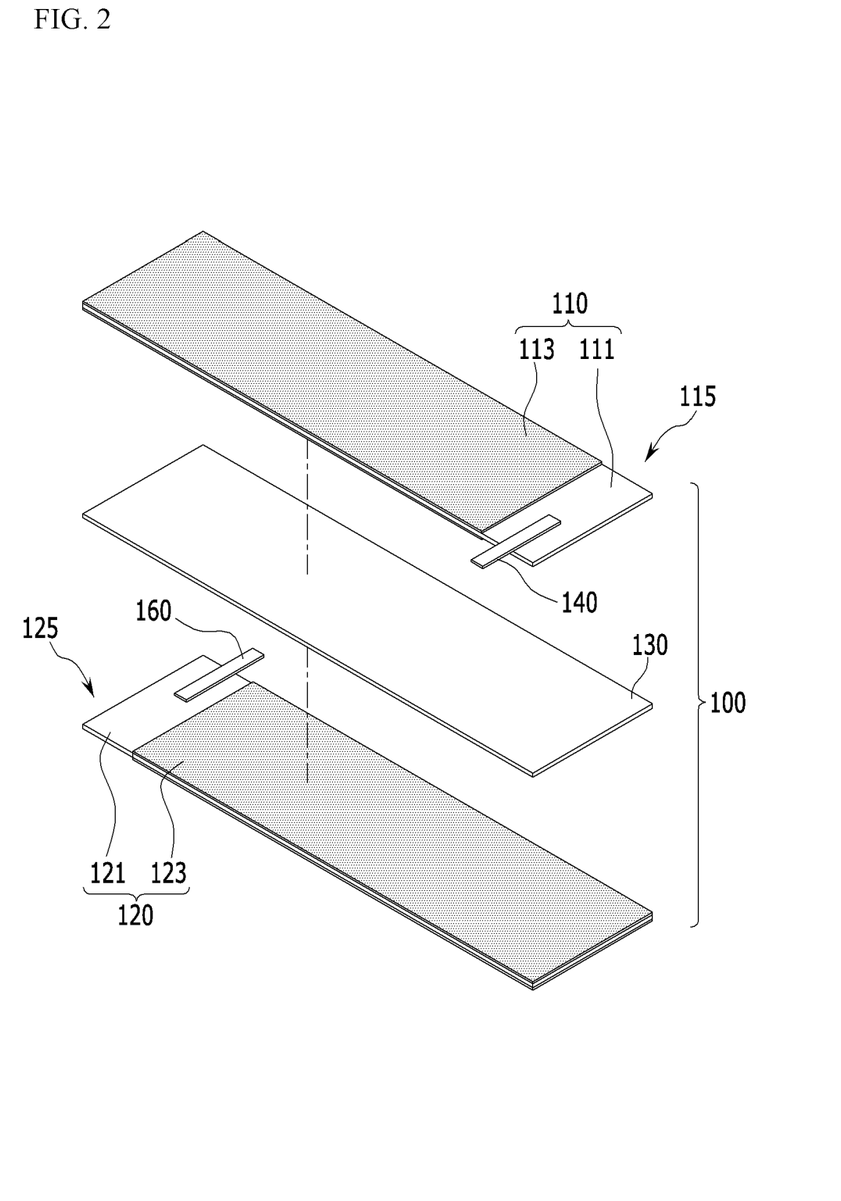
FIG. 2 is an exploded perspective view of the electrode assembly of FIG. 1, before being spirally wound.

FIG. 1 is a perspective view of a conventional jelly roll type of electrode assembly, and FIG. 2 is an exploded perspective view of the electrode assembly of FIG. 1 in a state of being spirally wound.

Referring to FIG. 1 and FIG. 2, a conventional jelly roll-shaped electrode assembly 100 includes a positive electrode 110, a negative electrode 120, and a separation membrane 130, and the separation membrane 130 is disposed between the positive electrode 110 and the negative electrode 120.

The positive electrode 110 includes a sheet-shaped positive current collector 111 and a positive active material layer 113 formed on the positive current collector 111. The positive current collector 111 includes a positive electrode uncoated region 115, which is a portion where the positive active material layer 113 is not formed. The positive electrode uncoated region 115 is disposed at opposite sides of the positive current collector 111.

a positive electrode tab 140 is attached to the positive electrode uncoated region 115 by welding such that the positive current collector 111 and the positive electrode tab 140 are connected with each other.

Figure 3:
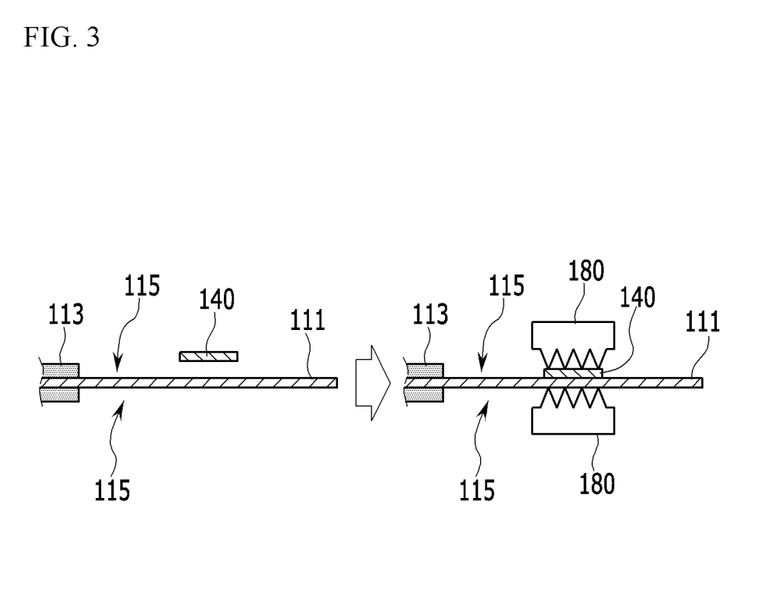
FIG. 3 is a schematic cross-sectional view of a case in which a positive electrode tab is welded to a conventional positive electrode current collector.

FIG. 3 is a schematic cross-sectional view of a case in which a positive electrode tab is welded to a conventional positive current collector.

Referring to FIG. 3, the positive current collector 111 and the positive electrode tab 140 are placed between welding devices 180, and ultrasonic welding or resistance welding is carried out. Since the welding device 180 damages an active material layer, as shown in FIG. 2, the positive electrode uncoated region 115 is provided at opposite sides of the positive current collector 111.

Similar or the same configurations as the conventional positive electrode 110 are applied to the conventional negative electrode 120, and thus negative electrode uncoated regions 125 are provided at both sides of a negative electrode current collector 121.

Since the active material layer is not formed in spaces that are occupied by the positive electrode uncoated portion 115 and the negative electrode uncoated portion 125 provided to the opposite sides of each of the positive current collector 111 and the negative current collector 121, a decrease of capacity of the electrode assembly 100 occurs. The number of positive electrode tabs 140 and the number of negative electrode tabs 160 are increased in a high-output model, and this causes an increase of the number of positive electrode uncoated regions 115 and the number of negative electrode uncoated regions 125, and accordingly capacity of the battery is significantly reduced. Thus, there is a need for research on a lithium rechargeable battery that can prevent a risk such as explosion of the lithium rechargeable battery due to overcharge, and at the same time, minimizes capacity of the battery in order to cope with the trend of high capacity and slimness.

DISCLOSURE

Technical Problem

The present invention has been made in an effort to provide an electrode assembly for a rechargeable battery, which can implement sufficient battery capacity while assuring stability with respect to overcharge and the like by improving a connection structure between an electrode tab and a current collector, and a method for manufacturing the same.

Technical Solution

In order to solve the above-stated problem, an electrode for a rechargeable battery, according to an exemplary embodiment of the present invention, includes: an electrode current collector having a coated region on which an electrode active material is formed on a first side thereof and an uncoated region on which the electrode active material layer is not formed on the first side; an electrode tab disposed on the uncoated region; and a conductive adhesion portion that is disposed between the uncoated region and the electrode tab, wherein the conductive adhesion portion comprises a positive temperature coefficient (PTC) material.

The conductive adhesion portion may further include an adhesive material and a conductive material.

The adhesive material, the conductive material, and the PTC material may form the conductive adhesion portion in the form of a slurry.

The PTC material may be silicon rubber or polyethylene.

The conductive adhesion portion may have a thickness of 10 micrometers or less.

In the exemplary embodiment, the electrode tab may be provided as a metal band-type member having a width and a length, the electrode tab may include an electrode tab overlapping portion stacked on the uncoated region and an electrode tab extension portion extending from the electrode tab overlapping portion to an outside of the electrode current collector, and the conductive adhesion portion may be formed with a same shape and area as the electrode tab overlapping portion.

A method for manufacturing an electrode according to another exemplary embodiment of the present invention includes: coating a conductive adhesion solution that includes a positive temperature coefficient (PTC) material on a metal plate for an electrode tab; providing a release film on the metal plate for the electrode tab to cover the coated conductive adhesion solution; transforming the conductive adhesion solution into a conductive adhesion portion by drying the conductive adhesion solution; forming a plurality of strips by slitting the metal plate for the electrode tab; manufacturing a plurality of electrode tabs, in each of which the conductive adhesion portion and the release film are stacked, by cutting at least one strip of the plurality of strips; removing the release film from one electrode tab of the plurality of electrode tabs; and bonding the one electrode tab from which the release film is removed to a first side of an electrode current collector.

In the coating the conductive adhesion solution, coated regions on which the conductive adhesive solution is coated in a vertical direction and uncoated regions where the conductive adhesion solution is not coated may be alternately placed along a horizontal direction of the metal plate for the electrode tab.

The plurality of strips may be cut so that each electrode table includes one coated region and one uncoated region.

The one electrode tab may include an electrode tab overlapping portion stacked on the electrode current collector and an electrode tab extension portion extending from the electrode tab overlapping portion to an outside of the electrode current collector, and a horizontal length of the one coated region may be the same as a length of the electrode tab overlapping portion and a horizontal length of the one uncoated region is the same as a length of the electrode tab extension portion.

In the bonding the electrode tab to the first side of the electrode current collector, the electrode tab may be bonded to an uncoated region where an electrode active material layer is not formed on the first side of the electrode current collector.

The conductive adhesion solution may be manufactured in the form of a slurry that further contains a conductive material and an adhesive material.

The PTC material may be a silicon rubber or polyethylene.

The conductive adhesion portion may have a thickness of 10 micrometers or less.

Advantageous Effect

According to the exemplary embodiments of the present invention, a PTC material is included in a conductive adhesion portion provided between the electrode tab and the electrode current collector, and thus an electrode for a rechargeable battery, which can assure safety with respect to an abnormal operation state such as overcharge while not increasing resistance in a normal operation state, can be manufactured.

In addition, a metal plate for an electrode tab, in which a conductive adhesion portion and a release film are formed, is slitted and cut such that an electrode tab having a conductive adhesion portion and a release film can be massively manufactured without performing an additional welding process.

MODE FOR INVENTION

Hereinafter, exemplary embodiments of the present invention will be described in more detail with reference to the accompanying drawings. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification.

In addition, the size and thickness of each configuration shown in the drawings are arbitrarily shown for better understanding and ease of description, but the present invention is not limited thereto. In the drawings, the thickness of layers, films, panels, regions, etc., are exaggerated for clarity.

It will be understood that when an element such as a layer, film, region, or substrate is referred to as being "on" another element, it can be directly on the other element or intervening elements may also be present. In contrast, when an element is referred to as being "directly on" another element, there are no intervening elements present. The word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, in this specification, the phrase "on a plane" means viewing a target portion from the top, and the phrase "on a cross-section" means viewing a cross-section formed by vertically cutting a target portion from the side.

Figure 4:
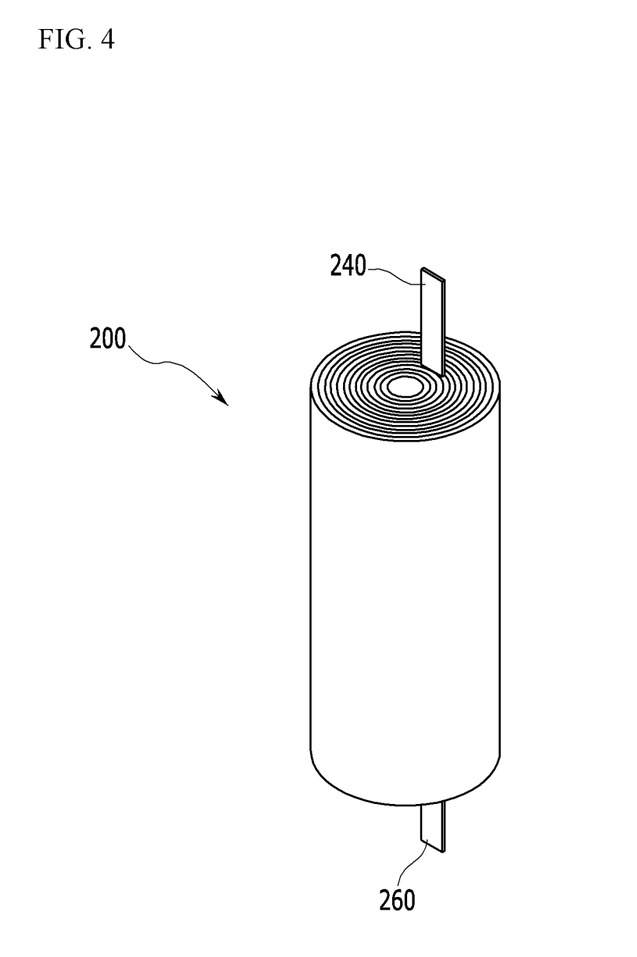
FIG. 4 is a perspective view of a jelly-roll shaped electrode assembly according to an exemplary embodiment of the present invention.
Figure 5:
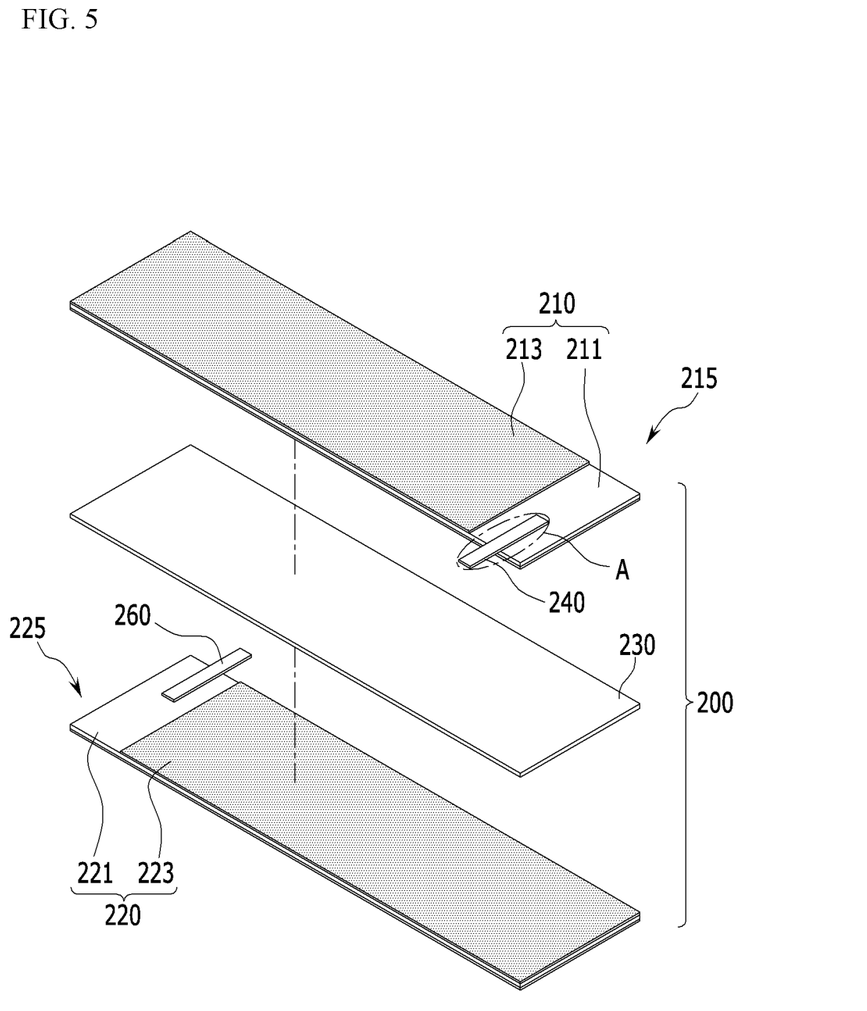
FIG. 5 is an exploded perspective view of the electrode assembly of FIG. 4, before being spirally wound.
Figure 6:
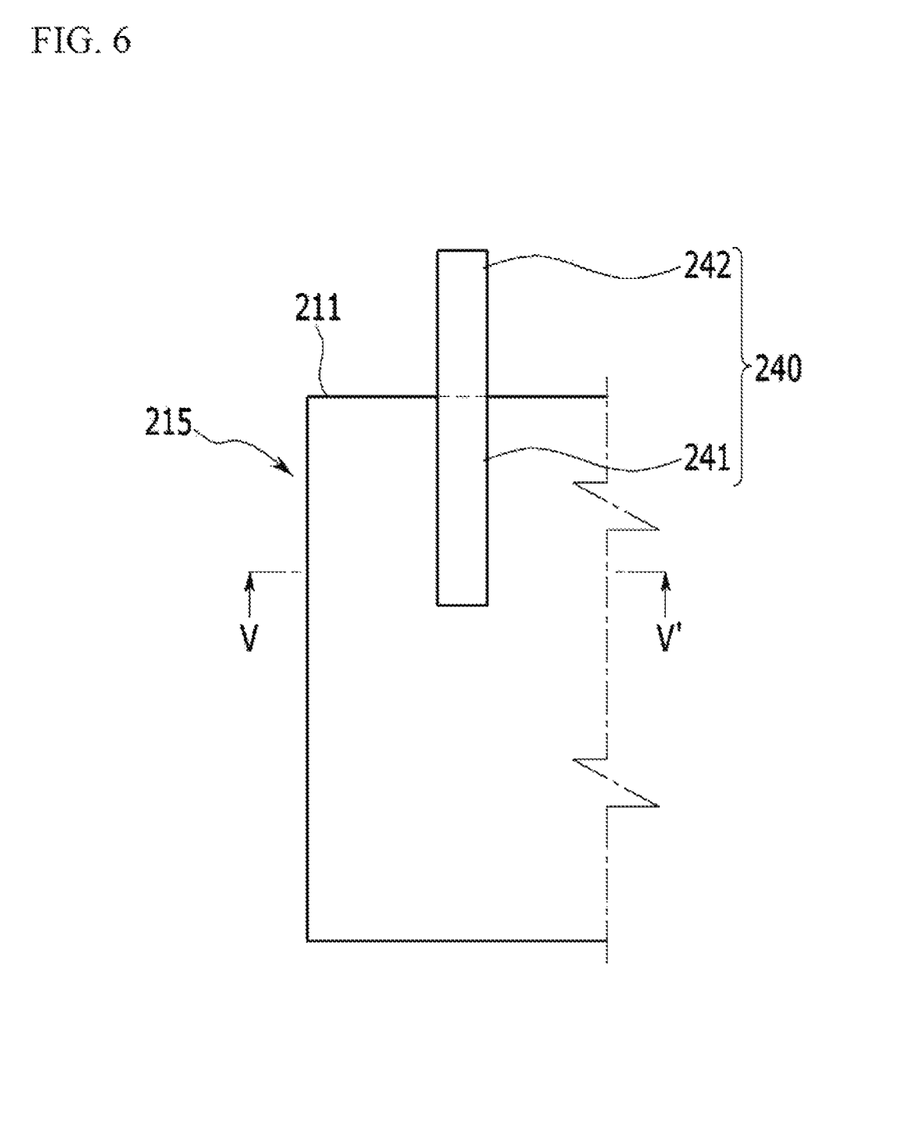
FIG. 6 is a partially enlarged top plan view of the portion A in FIG. 5.
Figure 7:
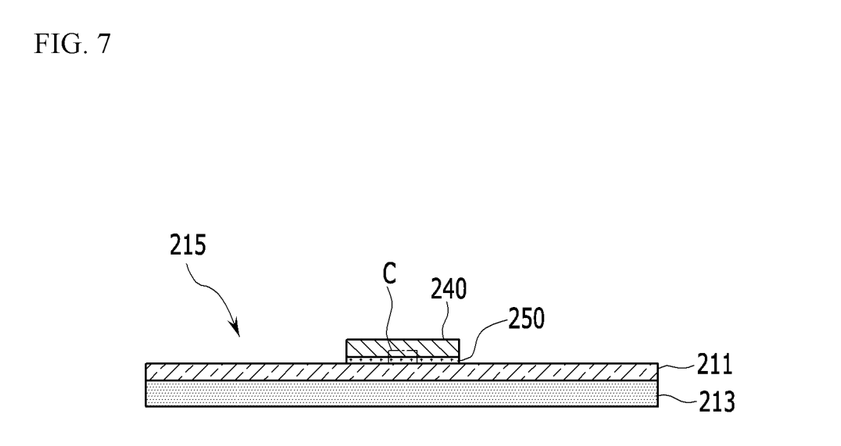
FIG. 7 is a cross-sectional view of FIG. 6, taken along the line V-V'.
Figure 8:
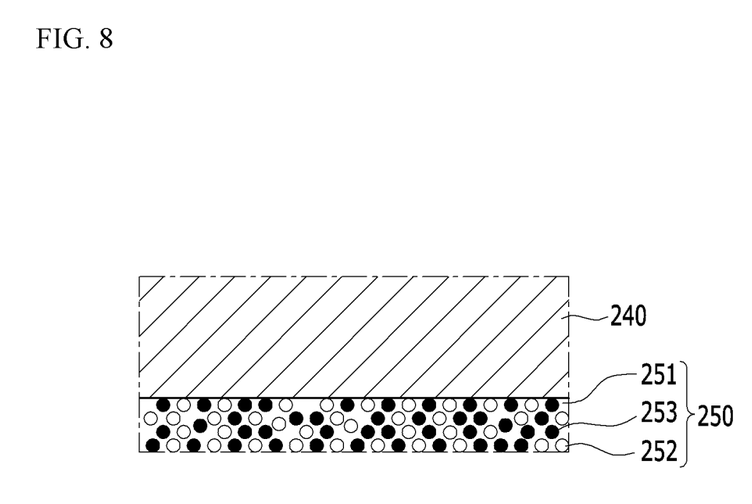
FIG. 8 is a partially enlarged cross-sectional view of the portion C in FIG.

FIG. 4 is a perspective view of a jelly roll-shaped electrode assembly according to an exemplary embodiment of the present invention. FIG. 5 is an exploded perspective view of the electrode assembly of FIG. 4, before being spirally wound. FIG. 6 is a partially enlarged top plan view of the portion A in FIG. 5. FIG. 7 is a cross-sectional view of FIG. 6, taken along the line V-V'. FIG. 8 is a partially enlarged cross-sectional view of the portion C in FIG. 7.

Referring to FIG. 4 and FIG. 5, an electrode assembly 200 according to the present exemplary embodiment includes a pair of electrodes and a separation membrane 230 disposed between the pair of electrodes. The pair of electrodes include a positive electrode 210 and a negative electrode 220. For convenience of description, the electrode assembly 200 before being spirally wound is illustrated in FIG. 5. Referring to FIG. 5, the positive electrode 210, the separation membrane 230, and the negative electrode 220 are provided in the form of a sheet and sequentially stacked. Such an electrode assembly 200 is received with an electrolyte in an exterior material (not shown) and sealed such that a rechargeable battery is manufactured.

A configuration of the positive electrode 210 and a configuration of the negative electrode 220 are similar to or to the same as each other, and thus, the positive electrode 210 will be mainly described with reference to FIG. 5.

Referring to FIG. 5, the positive electrode 210 includes a positive electrode current collector 211 formed in the shape of a sheet, and a positive electrode active material layer 213 formed on the positive electrode current collector 211. The positive electrode current collector 211 includes a positive electrode uncoated region 215, which is a portion where the positive electrode active material layer 213 is not formed. As shown in the drawing, the positive electrode active material layer 213 is preferably formed at both sides of the positive electrode current collector 211 for capacity assurance. The positive electrode active material layer 213 is coated on a part of the positive electrode current collector 211, and as shown in FIG. 5, may be coated on the positive electrode current collector 211, excluding a rectangular-shaped area at one end in a length direction of the positive electrode current collector 211. The portion where the positive electrode active material layer 213 is not formed corresponds to the positive electrode uncoated region 215. Unlike a conventional case in which the positive electrode uncoated region 215 is formed on both sides of the positive electrode current collector 211, the positive electrode uncoated region 215 according to the present exemplary embodiment is formed only on one side of the positive electrode current collector 211. A positive electrode tab 240 is bonded to the positive electrode uncoated region 215, and thus the positive electrode tab 240 and the positive electrode 210 are electrically connected with each other. In the present exemplary embodiment, the positive electrode tab 240 may be bonded to the positive electrode uncoated region 215 by a conductive adhesion portion, and this will be described later with reference to FIG. 7.

Since the positive electrode tab 240 is bonded not by using welding but by a conductive adhesion portion 250, the positive electrode uncoated region 215 can be formed on only one side of the electrode current collector without causing damage to the positive electrode active material layer 213. Thus, the area of the positive electrode active material layer 213 can be increased, and accordingly, the amount of active material can be increased, thereby increasing capacity of a rechargeable battery. In particular, in a high-output model of the battery, the number of electrode tabs is increased, and accordingly capacity of the battery can be significantly increased compared to a conventional case.

However, a location and a shape of the positive electrode uncoated region 215 are not restrictive, and can be modified. For example, the positive electrode uncoated region 215 is formed as a rectangular-shaped area at one end of the positive electrode current collector 211 in a width direction. Alternatively, the positive electrode uncoated region 215 may be formed as a rectangular-shaped area at a center of the positive electrode current collector 211. Further, in the present exemplary embodiment, the positive electrode uncoated region 215 exemplarily extends from one side to the other side of the positive electrode current collector 211, but the positive electrode uncoated region 215 may be formed with a minimum size only at an area that overlaps the positive electrode tab 240. Similar to the above-stated positive electrode 210, the negative electrode 220 includes a sheet-shaped negative electrode current collector 221 and a negative electrode active material layer 223 formed on the negative electrode current collector 221. The content with respect to the above-described positive electrode 210 may be applied as a constituent element related to the negative electrode 220.

Referring to FIG. 5, the positive electrode uncoated region 215 is disposed at one end in a length direction of the positive electrode current collector 211, and the negative electrode uncoated region 225 is disposed at one end in a length direction of the negative electrode current collector 221. The positive electrode uncoated region 215 and the negative electrode uncoated region 225 are disposed opposite to each other. However, the locations of the positive electrode uncoated region 215 and negative electrode uncoated region 225 are not limited thereto, and may be the same or they may overlap each other.

Aluminum is mainly used as a material of the positive electrode current collector 211. In addition, the positive electrode current collector 211 may be formed of stainless steel, nickel, titanium, sintered carbon, or aluminum, or stainless steel surface-treated with carbon, nickel, titanium, or silver. Furthermore, there is no limit to the use of a positive electrode current collector 211 as long as it is a material with high conductivity without causing a chemical change of the rechargeable battery.

As a material of the negative electrode current collector 221, copper is mainly used. In addition to this, the negative electrode current collector 221 may be formed of stainless steel, aluminum, nickel, titanium, sintered carbon, or copper, or stainless steel-surface treated with carbon, nickel, titanium, silver, and the like, or an aluminum-cadmium alloy and the like may be used.

A positive electrode active material that forms the positive electrode active material layer 213 is a lithium-based active material, and a metal oxide such as $LiCoO_2$, $LiNiO_2$, $LiMnO_2$, $LiMn_2O_4$, $LiFePO_4$, or $Li_{1+z}Ni_{1-x-y}Co_xM_yO_2$ ($0 \leq x \leq 1$, $0 \leq y \leq 1$, $0 \leq x+y \leq 1$, $0 \leq z \leq 1$, and M is a metal such as Al, Sr, Mg, La, Mn, and the like) may be representatively used. A negative electrode active material that forms the negative active material layer 223 is a carbon-based active material, and as the negative active material, crystalline carbon, amorphous carbon, a carbon composite, or a carbon fiber, a lithium metal, a lithium alloy, and the like may be used.

The positive electrode active material layer 213 and the negative active material layer 223 may further include a binder and a conductive material in addition to the active material. The binder is provided to appropriately bind active material particles to each other and appropriately bind the active material to the current collector, and representatively includes polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, an epoxy resin, nylon, or the like, may be used, but the binder is not limited thereto. The conductive material is used in order to impart conductivity to an electrode, and any material may be used as long as it does not cause chemical changes in a battery to be configured, and is an electron-conductive material. As an example, a conductive material including a carbon-based material such as natural graphite, artificial graphite, carbon black, acetylene black, Ketjen black, carbon fiber, or the like; a metal based material such as metal powder or metal fiber of copper, nickel, aluminum, silver, or the like; a conductive polymer such as a polyphenylene derivative, or the like; or a mixture thereof may be used.

The separation membrane 230 is not particularly restrictive as long as it is a porous material. The separation membrane 230 may be formed of a porous polymer membrane such as a porous polyolefin membrane, polyvinylidene fluoride-hexafluoropropylene, polyvinylidene fluoride-trichloroethylene, polymethyl methacrylate, polyacrylonitrile, polyvinyl pyrrolidone, polyvinyl acetate, an ethylene vinyl acetate copolymer, a polyethylene oxide, cellulose acetate, cellulose acetate butyrate, cellulose acetate propionate, cyanoethyl pullulan, cyanoethyl polyvinyl alcohol, cyanoethyl cellulose, cyanoethylsucrose, pullulan, carboxymethyl cellulose, an acrylonitrile-butaduene-styrene copolymer (ABS), polyimide, polyethylene terephthalate, polybutylene terephrhalate, polyester, polyacetal, polyamide, polyether ether ketone, polyethersulfone, polyphehyleneoxide (PPO), polyphenylene sulfide, polyethylene naphthalene, a non-woven film, a membrane having a porous web structure, or a mixture thereof.

Inorganic particles may be settled to a cross-section or both sides of the separation membrane 230. The inorganic particles are preferably an inorganic particle having a high dielectric constant of 5 or more, and more preferably inorganic particles having a dielectric constant of 10 or more and a low density. This is so it can easily transfer lithium ions moving in the cell. The 5 or more high dielectric constant unlimitedly includes, for example, $Pb(Zr, Ti)O_3$ (PZT), $Pb_{1-x}La_xZr_{1-y}Ti_yO_3$ (PLZT), $Pb(Mg_3Nb_{2/3})O_3$—$PbTiO_3$ (PMN-PT), $BaTiO_3$, $HfO_2$, $SrTiO_3$, $TiO_2$, $Al_2O_3$, $ZrO_2$, $SnO_2$, $CeO_2$, $MgO$, $CaO$, $ZnO$, $Y_2O_3$, or a mixture thereof.

Referring to FIG. 5 and FIG. 6, the positive electrode tab 240 may be a metallic band-type member having a predetermined width and length. The positive electrode tab 240 is electrically connected with the positive electrode uncoated region 215 while overlapping the positive electrode uncoated region 215 of the positive electrode current collector 211. Specifically, the positive electrode tab 240 includes a positive electrode tab overlapping portion 241 stacked on the positive electrode current collector 211, and a positive electrode tab extension portion 242 protruding to the outside from one end of the positive electrode current collector 211 in the positive electrode tab overlapping portion 241.

The positive electrode tab overlapping portion 241 is fixed to the positive electrode uncoated region 215 of the positive electrode current collector 211. The positive electrode 210 to which the positive electrode tab 240 is fixed is sequentially stacked with the separation member 230 and the negative electrode 220 and then spirally wound with them, and thus the positive electrode tab 241 overlaps the positive electrode 210 and the separation membrane 230.

As shown in FIG. 7, the positive electrode tab 240 is attached to the positive electrode uncoated region 215 of the positive electrode current collector 211 not by welding but by the conductive adhesion portion 250. Thus, the positive electrode 210 and the positive electrode tab 240 are electrically connected with each other. The conductive adhesion portion 250 has an adhesive property and thus fixes the positive electrode tab 240 to the positive electrode current collector 211.

Specifically, the conductive adhesion portion 250 may have a shape and an area that are the same as those of the positive electrode tab overlapping portion 241. The conductive adhesion portion 250 requires a length or an area that can satisfy a minimum required adhesive force. However, in case of a high-output model, a temperature may be locally increased due to a current concentration when the positive electrode tab overlapping portion 241 has a narrow area, and thus the area of the conductive adhesion portion 250 is formed to be the same as the entire area of the positive electrode tab overlapping portion 241 that contacts the positive electrode current collector 211.

Referring to FIG. 8, the conductive adhesion portion 250 includes an adhesive material 251, a conductive material 252, and a PTC material 253. The adhesive material 251 should not react with an electrolyte solution, and, is preferably, for example, an acrylate-based material. The adhesive material 251 may be butyl acrylate/4-hydroxybutyl acrylate=98:2, or ethylhexyl acrylate/acrylic acid=98:2.

The positive electrode tab 240 may be formed of a metallic material that is the same type of the positive electrode current collector 211. For example, the metallic material may be aluminum. In such a case, the conductive material 252 of the conductive adhesion portion 250 in the positive electrode 210 may preferably be one of aluminum particles, carbon nanotubes (CNT), and a carbon black. In particular, the aluminum particles are preferred. Thus, a path of a current, formed of an aluminum material can be provided between the positive electrode tab 240, the conductive adhesion portion 250, and the positive electrode current collector 211 without causing an increase of contact resistance. The aluminum particles may be spherical particles.

A negative electrode tab 260 may be made of the same type of metallic material as the negative electrode current collector 221. For example, the negative electrode tab 260 may be made of copper. In such a case, a conductive material (not shown) of the conductive adhesive portion in the negative electrode 220 is preferably one of CNT, carbon black, and copper particles. In particular, the copper particles are preferred. Thus, a current path, which is based on the copper material, can be provided between the negative electrode tab 260, the conductive adhesion portion (not shown), and the negative electrode current collector 221 without causing contact resistance.

In a normal operation state of the rechargeable battery, the conductive adhesion portion 250 has a level of conductivity at which resistance is not greatly increased due to an electrical path by the conductive material 252 having low resistance compared to a case in which the PTC material 253 is not included.

The PTC material 253 is formed of a material of which resistance is rapidly increased when an internal temperature of the battery is increased. When the internal temperature of the battery is increased due to abnormal operation conditions such as overcharge, overdischarge, and the like, resistance of the PTC material included in the conductive adhesion portion is rapidly increased. The resistance increase of the conductive adhesion portion causes the battery to reach a termination voltage such that stability of the rechargeable battery with respect to an abnormal operation condition can be assured.

The PTC material 253 can be formed of any material of which resistance is rapidly increased according to a temperature increase. For example, the PTC material 253 may be made of a silicon rubber or polyethylene.

The conductive adhesion portion 250 formed of the adhesive material 251, the conductive material 252, and the PTC material 253 may be applied in the form of a slurry between the electrode current collector and the electrode tab. Since the conductive adhesion portion 250 is provided in the form of a slurry, the thickness of the conductive adhesion portion 250 can be more easily adjusted, or the content of the PTC material 253 in the conductive adhesion portion 250 can be adjusted.

As the content of the PTC material 253 is increased, resistance is more rapidly increased in an abnormal operation state such that the battery promptly reaches the termination voltage, and at the same time, the PTC material 253 acts as resistance in the battery, thereby deteriorating performance of the battery. It is necessary to properly adjust quanta depending on the field where the battery is used, and in the exemplary embodiment of the present invention, it is possible to freely adjust the degree of reaching the termination voltage with respect to overcharge, overdischarge, and the like and the resistance value of the conductive adhesion portion 250, regardless of the battery to be manufactured, by adjusting the slurry thickness or the content of the PTC material 253, thereby reducing manufacturing cost of the battery.

In addition, since an operation temperature is predetermined in case of a conventional PTC element, there is a problem that a manufacturing process is complicated and manufacturing cost is increased because the element needs to be manufactured differently when the operation temperature of the PTC is different for each battery to be manufactured. However, in the exemplary embodiment of the present invention, a PTC operation temperature can be more simply adjusted by adjusting the slurry thickness or the content of the PTC material 253.

In addition, since the conductive adhesion portion 250 is coated in the form of a slurry, the adhesive material 251, the conductive material 252, and the PTC material 253 can be evenly dispersed rather than being concentrated to a specific portion, and accordingly, the electrical conductivity, the degree of adhesion, and the degree of reaching the termination voltage can be effectively assured.

Weight ratios of the adhesive material 251, the conductive material 252, and the PTC material 253 with respect to the conductive adhesion portion 250 are respectively, preferably fixed to 40%, 30% to 50%, and 10% to 30%.

The conductive adhesion portion 250 may act as resistance in the battery, and thus the conductive adhesion portion 250 preferably has a thickness of 10 micrometers or less.

As described with reference to FIG. 3, conventionally, the uncoated regions where no active material layer is coated are provided at both sides of the electrode current collector and then tabs are welded to the uncoated regions, but in the exemplary embodiment of the present invention, the tab is bonded to the uncoated region through the conductive adhesion portion 250 rather than through welding, and thus as shown in FIG. 5 to FIG. 7, the positive electrode tabs 240 can be formed by forming the positive electrode uncoated regions 215 on the other side even when the positive electrode active material layer 213 is completely coated on one side of the positive electrode current collector 211. Thus, there is no need to form the uncoated region in a side that is opposite to a side to which the positive electrode tab 240, and accordingly sufficient capacity can be assured. A configuration of the positive electrode 210 and a configuration of the negative electrode 220 are similar to or the same as each other, and accordingly, the negative electrode 220 also assures sufficient battery capacity.

When the PTC material 253 that is provided for assuring stability with respect to overcharge, external short circuit, nail penetration, local damage, and the like is included in an electrode layer that contains an active material, the amount of active material is reduced by as much as a space occupied by the PTC material 253 and battery capacity is reduced. Thus, according to the exemplary embodiment of the present invention, the PTC material 253 is provided in the conductive adhesion portion 250 between the electrode current collectors 211 and 221 and the electrode tabs 240 and 260, thereby minimizing battery efficiency deterioration due to reduction of the active material.

In addition, since the PTC material 253 is provided between the electrode current collectors 211 and 221 and the electrode tabs 240 and 260, more sensitive reaction can be carried out with respect to a temperature increase. Explosion of the battery under an abnormal operation state such as overcharge and the like can be determined by a very fine temperature difference. Thus, the PTC material 253 is placed not outside the electrode assembly 200 but in the conductive adhesion portion 250 so that it can more sensitively react with a temperature, and stability of the battery can be further secured by advancing the reaching point of the termination voltage.

Figure 9:
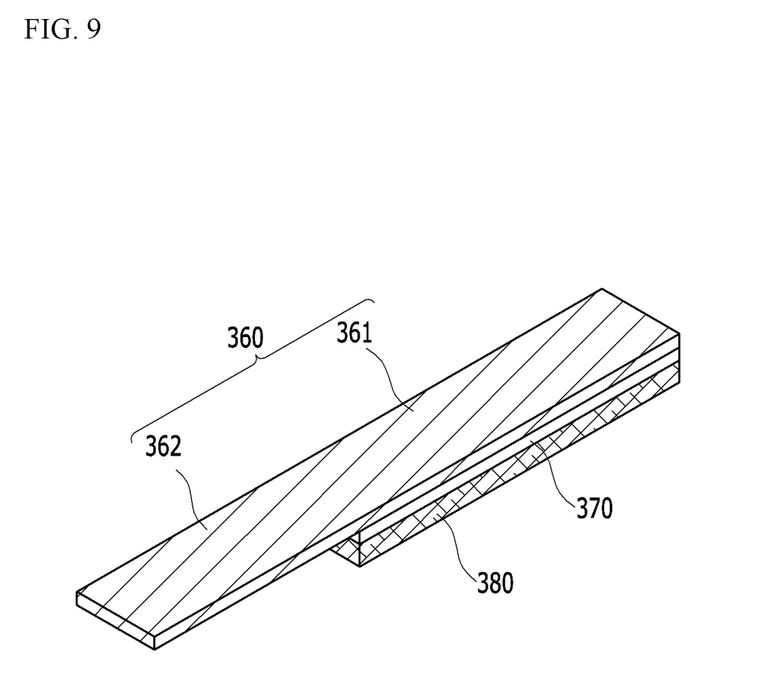
FIG. 9 is a perspective view of an electrode tab according to an exemplary embodiment of the present invention.

FIG. 9 is a perspective view of an electrode tab according to an exemplary embodiment of the present invention. An electrode tab 360 of FIG. 9 is the above-described positive electrode tab 240 or negative electrode tab 260, and may be used in manufacturing of the electrode assembly 200.

Referring to FIG. 9, the electrode tab 360 is electrically connected with an electrode assembly, while overlapping the same, and is provided as a metal band-type member having a width and a length. The electrode tab 360 includes an electrode tab overlapping portion 361 stacked on the electrode assembly and an electrode tab extension portion 362 extending to the outside the electrode assembly from the electrode tab overlapping portion 361. A conductive adhesion portion 370 and a release film 380 are stacked on the electrode tab overlapping portion 361 with the same shape and area as the electrode tab overlapping portion 361.

Hereinafter, a method for manufacturing an electrode assembly that enables mass production of a rechargeable battery will be described.

Figure 10:
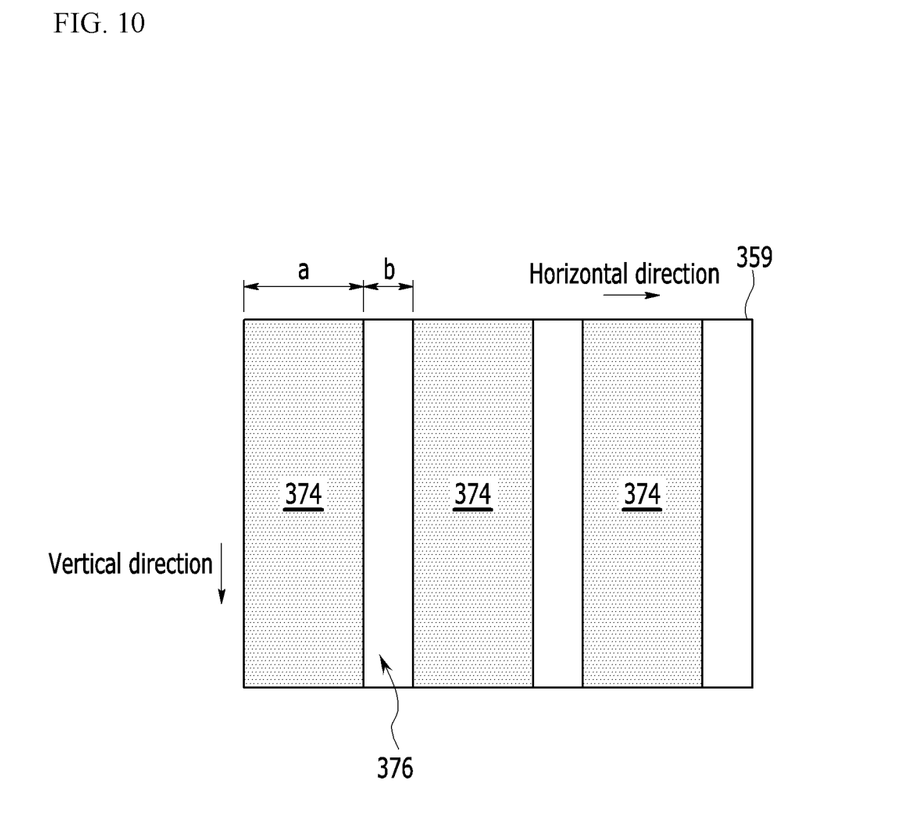
FIG. 10 and FIG. 11 are provided for description of a method for manufacturing an electrode assembly according to an exemplary embodiment of the present invention.
Figure 11:
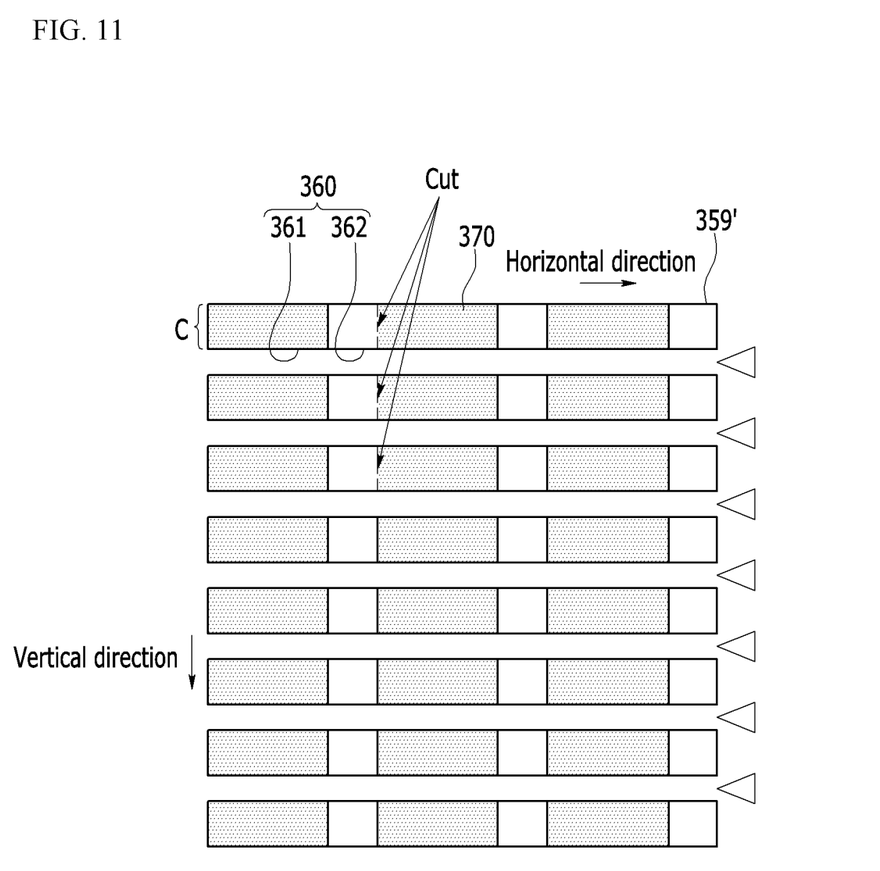

FIG. 10 and FIG. 11 are provided for description of a method for manufacturing an electrode assembly according to the present invention.

A conductive adhesion solution is manufactured in the form of a slurry by mixing an adhesive material, a conductive material, and a PTC material. As previously described, the adhesive material should not react with an electrolyte solution, and for example, an acrylate-based material is preferred. The PTC material is not particularly limited as long as it is a material of which resistance increases according to an increase of a temperature. For example, the PTC material may be a silicon rubber or polyethylene.

Referring to FIG. 10, the conductive adhesion solution is coated on a tab metal plate 359. In this case, as shown in FIG. 10, a coated region 374 where the conductive adhesion solution is coated in a vertical direction and an uncoated region 376 where the conductive adhesion solution is not coated are placed alternately along a horizontal direction. A horizontal length a of the coated region 374 and a length of the electrode tab overlapping portion 361 of FIG. 9 are equal to each other, and a horizontal length b of the uncoated region 376 and the electrode tab extension portion 362 of FIG. 9 are equal to each other. As described, the coated regions 374 are not formed throughout the entire tab metal plate 359 but are formed in the pattern of a stripe. For this, slot die coating that is similar to a method used to coat an electrode active material layer, or a method that sprays the conductive adhesion solution while covering the uncoated regions 376 by placing a blocking film such as a bar and the like thereon, may be used.

Next, a release film that covers the coated regions 374 and the uncoated regions 376 is stacked on the tab metal plate 359.

Then, the conductive adhesion solution of the coated regions 374 is dried such that a conductive adhesive portion 370 is formed.

Next, as shown in FIG. 11, the tab metal plate 359 is slit into several strips 359' in accordance with a width of an electrode tab 360 along a vertical direction.

Next, when the strips 359' are cut so that one of the coated regions 374 and one of the uncoated regions 376 are included in each stripe 359', as shown in FIG. 9, a plurality of electrode tabs 360 in each of which a conductive adhesion portion 370 and a release film 380 are stacked in an electrode tab overlapping portion 361 can be formed with the same shape and area as the electrode tab overlapping portion 361.

In the manufacturing process of the electrode assembly 200, a reel-shaped strip 359' is provided and then cut in a winder so that one of the coated regions 374 and one of the uncoated regions 376 are included in each strip 359' such that the electrode tab 360 is formed, and then the release film 380 is removed to place the conductive adhesion portion 370 on the positive electrode uncoated region 215 and/or the negative electrode uncoated region 225. As described, through such a series of process, the electrode tab 360 can be bonded to the electrode current collector without performing welding, thereby manufacturing the electrode assembly 200.

The electrode tab according to the present invention can replace a conventional electrode tab that requires a welding method, and thus may be used in manufacturing of an electrode assembly and a rechargeable battery including the electrode assembly. The electrode tab according to the present invention is provided as an adhesive tab, and thus the electrode tab is bonded to the electrode current collector after peeling off a release film, thereby simply manufacturing a rechargeable battery without performing a conventional complicated welding process. Since additional ultrasonic welding is carried to attach an electrode tab to a current collector in a conventional manufacturing process of an electrode assembly, equipment cost and maintenance cost associated with the welding are incurred and efficiency is degraded. In the present invention, such a problem is solved by using an electrode tab to which a release film is attached.

The electrode assembly of the present invention, which can be manufactured by such a method, enables connection between the electrode tab and the electrode current collector without damaging the active material layer. The uncoated region may be formed only on one side of the current collector, thereby increasing the capacity of the rechargeable battery. In addition, the PTC material for securing stability can be placed not in the electrode layer but in the conductive adhesion portion between the electrode current collector and the electrode tab, thereby minimizing deterioration of the cell efficiency due to reduction of the active material.

As described above, according to the present invention, since the connection structure between the electrode tab and the current collector is improved, a rechargeable battery that can minimize a limitation in battery capacity while assuring stability with respect to the abnormal operation situation such as overcharge and external short circuit can be manufactured. In particular, in the high output model where the number of electrode tabs increases, the effect of current blocking and improvement of battery capacity becomes more apparent.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

200: electrode assembly
250, 370: conductive adhesion portion
251: adhesive material
252: conductive material
253: PTC material

The invention claimed is:

1. An electrode comprising:
   an electrode current collector having a coated region on which an electrode active material is formed on a first side thereof and an uncoated region on which the electrode active material layer is not formed on the first side;
   an electrode tab disposed on the uncoated region of the electrode current collector; and
   a conductive adhesion portion that is disposed between the uncoated region of the electrode current collector and the electrode tab,
   wherein the conductive adhesion portion comprises a positive temperature coefficient (PTC) material,
   wherein the electrode tab is provided as a metal band-type member having a width and a length,
   wherein the electrode tab comprises an electrode tab overlapping portion stacked on the uncoated region and an electrode tab extension portion extending from the electrode tab overlapping portion to an outside of the electrode current collector,
   wherein the conductive adhesion portion is formed with a same shape and area as the electrode tab overlapping portion,
   wherein the electrode tab is not welded to the uncoated region of the electrode current collector,
   wherein the electrode current collector has a coated region of the electrode current collector on a second side opposite the first side, and the second side does not have an uncoated region of the electrode current collector,
   wherein the conductive adhesion portion further comprises an adhesive material and a conductive material, and
   wherein the adhesive material, the conductive material, and the PTC material form the conductive adhesion portion in the form of a slurry.

2. The electrode of claim 1, wherein the PTC material is silicon rubber or polyethylene.

3. The electrode of claim 1, wherein the conductive adhesion portion has a thickness of 10 micrometers or less.

4. A rechargeable battery comprising the electrode of claim 1.

5. An electrode comprising:
   an electrode current collector having a coated region on which an electrode active material is formed on a first side thereof and an uncoated region on which the electrode active material layer is not formed on the first side;
   an electrode tab disposed on the uncoated region of the electrode current collector; and
   a conductive adhesion portion that is disposed between the uncoated region of the electrode current collector and the electrode tab,
   wherein the conductive adhesion portion comprises a positive temperature coefficient (PTC) material,
   wherein the electrode tab is provided as a metal band-type member having a width and a length,
   wherein the electrode tab comprises an electrode tab overlapping portion stacked on the uncoated region and an electrode tab extension portion extending from the electrode tab overlapping portion to an outside of the electrode current collector,
   wherein the conductive adhesion portion is formed with a same shape and area as the electrode tab overlapping portion, and
   wherein the electrode current collector has a coated region of the electrode current collector on a second side opposite the first side, and the second side does not have an uncoated region of the electrode current collector.

* * * * *